(12) United States Patent
Haworth, Jr. et al.

(10) Patent No.: US 9,120,240 B2
(45) Date of Patent: Sep. 1, 2015

(54) FRUIT AND VEGETABLE DECORATIVE CUTTING DEVICE

(71) Applicants: Chester M. Haworth, Jr., Gilbert, AZ (US); Steven A Haworth, Gilbert, AZ (US)

(72) Inventors: Chester M. Haworth, Jr., Gilbert, AZ (US); Steven A Haworth, Gilbert, AZ (US)

( * ) Notice: Subject to any disclaimer, the term of this patent is extended or adjusted under 35 U.S.C. 154(b) by 243 days.

(21) Appl. No.: 13/901,947

(22) Filed: May 24, 2013

(65) Prior Publication Data

US 2013/0312269 A1    Nov. 28, 2013

Related U.S. Application Data

(60) Provisional application No. 61/651,459, filed on May 24, 2012.

(51) Int. Cl.
| | |
|---|---|
| *B26D 3/00* | (2006.01) |
| *B26D 3/26* | (2006.01) |
| *A47J 17/00* | (2006.01) |
| *B26D 3/10* | (2006.01) |
| *B26D 7/00* | (2006.01) |

(52) U.S. Cl.
CPC . *B26D 3/00* (2013.01); *A47J 17/00* (2013.01); *B26D 3/10* (2013.01); *B26D 3/26* (2013.01); *B26D 2007/0037* (2013.01)

(58) Field of Classification Search
CPC .............. G03B 9/08; B26D 3/00; B26D 3/26; B26D 3/10; B26D 2007/0037; A47J 17/00
USPC ........ 30/112, 110, 173, 279.2, 278–279, 287, 30/183, 114, 176, 152; 362/281–283; 359/379, 894, 452, 227, 234–235; 123/336–337; 99/537
See application file for complete search history.

(56) References Cited

U.S. PATENT DOCUMENTS

| | | | |
|---|---|---|---|
| 909,145 A | 1/1909 | Brunson | |
| 1,504,501 A | 8/1924 | Pope | |
| 3,190,330 A * | 6/1965 | Hawkins | 30/176 |
| 3,759,127 A * | 9/1973 | Mills | 83/318 |
| 3,888,000 A | 6/1975 | Ladlow et al. | |
| 4,779,504 A | 10/1988 | Murphy et al. | |
| 4,930,219 A | 6/1990 | Nadeau | |
| 6,032,368 A | 3/2000 | Huang | |
| 6,102,554 A * | 8/2000 | Wynne Willson et al. | 362/281 |
| 6,199,283 B1 | 3/2001 | Bryant | |
| 6,637,116 B1 | 10/2003 | Hill | |
| 2008/0178469 A1* | 7/2008 | Gutman | 30/111 |

* cited by examiner

*Primary Examiner* — Ned Landrum
*Assistant Examiner* — Nhat Chieu Do
(74) *Attorney, Agent, or Firm* — Mark V. Loen

(57) ABSTRACT

A kitchen tool that cuts a zig-zag pattern into a vegetable or fruit which encompasses the total circumference is disclosed. This is accomplished by rotating two handles relative to each other so that movable blades, via cams, are forced into the fruit/vegetable. The movable blades are constrained to a linear motion by guiding surfaces in top and bottom plates along with cams and pins. The entire cutting assembly is readily cleanable by easy disassembly or thorough rinsing/washing.

1 Claim, 6 Drawing Sheets

1-1

1-2

FRUIT AND VEGETABLE DECORATIVE CUTTING DEVICE

CROSS REFERENCE TO RELATED APPLICATIONS

This application claims the benefit of U.S. Provisional Application No. 61/651,459 filed on May 24, 2012. The prior provisional application is incorporated by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION (1) Field of the Invention

This invention is directed toward the food arts, in particular, toward decorative effects upon foods where food is presented favorably to the consumer in an attractive and ornamental manner. The present invention is designed to simplify certain cutting functions, thereby to enhance consumer appeal, where food may be presented on a banquet or buffet table at the discretion of the chef or caterer in a timely and appealing manner. In particular, the cutting effect is to create a designed cut through shape with a saw tooth/zig-zag outer edge.

(2) Description of Related Art

Others have worked in the art to create decorative cutting effects on fruits and vegetables. For example, U.S. Pat. No. 3,888,000 is a multi-blade decorative cutter. However, it lacks important utility in that it is designed less broadly, and is useful for particular foods. The outer grip is likely to be slippery when wet, which is a likely occurrence when cutting fruits, making it difficult to cut tougher foods.

U.S. Pat. No. 6,637,116 is a two bladed cutter but lacks the ability to cut evenly for a variety of diameters.

U.S. Pat. No. 6,199,283 is a single blade cutter that is labor intensive and simply takes too long to perform a task when there are a lot of fruit and vegetables to cut.

U.S. Pat. No. 909,145 and U.S. Pat. No. 4,779,504 are a single long blade that fails to make a pleasing cut because the single blade cannot match to the variety of diameters. The cut will have an awkward place where the cut will be uneven, that is, will have a seam. Similarly, U.S. Pat. No. 1,504,501 also fails to make a pleasing cut in spite of its flexibility.

These previous designs fail to accommodate the need for a convenient and rapid method of cutting the fruit in the decorative manner desired.

BRIEF SUMMARY OF THE INVENTION

The apparatus is a kitchen tool food cutter that cuts a zig-zag pattern into a vegetable or fruit, encompassing the total circumference. This is accomplished by rotating two handles relative to each other so that movable blades, via cam slots and pins, are forced into the food item. The movable blades are constrained to a radial motion by guiding surfaces in the top and bottom plates. The entire cutting assembly is affordably made by injection molding and readily cleanable by easy disassembly or thorough rinsing/washing.

BRIEF DESCRIPTION OF THE SEVERAL VIEWS OF THE DRAWING(S)

DETAILED DESCRIPTION OF THE INVENTION

Figure 1A:
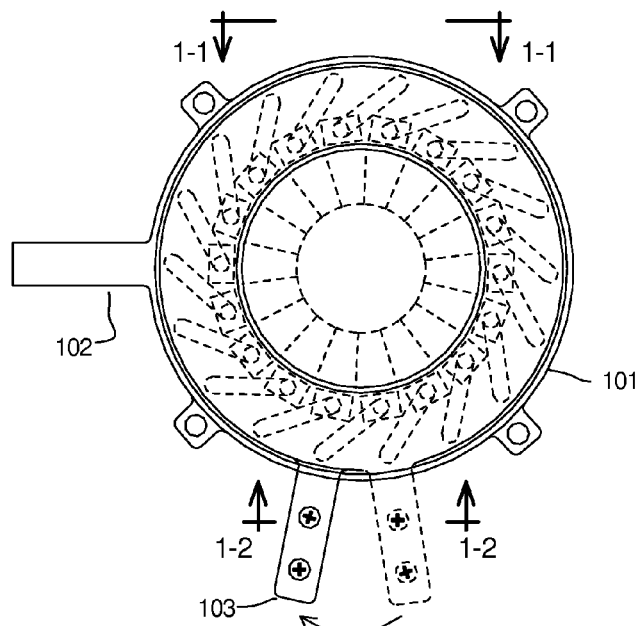
FIGS. 1A-1E shows a top view assembly of the present invention and the method by which the blades are moved in and out.

The present invention is a simple and elegant device whereby a generally round, or oval, fruit or vegetable may be cut into a zig-zag shape and broken in two. The two halves may be presented for consumption. They may additionally be hollowed out and the two shells used for decoration or as holders for other consumable food.

The device, as shown in a top view assembly in FIGS. 1A-1E, may be made from a variety of materials, such as plastic or metal, and the parts made by such methods as injection molding to be economically produced. Metallic parts may be machined or stamped from known methods.

As seen in FIGS. 1A-1E, the assembly of stacked parts 101 is a combination of a number of plates in order along with blades 104 that move in and out. The blades are inserted into cam-pin followers 105 with pins that follow slots 107. Two handles, a moving handle 103 and a fixed handle 102 are used to force the blades inward and outward through a cam action by using two cam guide plates that sandwich a number of cam-pin followers 105. A spacer 106 helps to separate the stack of plates and provide space for the cam movement without pinching or binding. The number of blades and the opening size in the plates determine the size of the fruit that can be cut.

Figure 1B:
Figure 1B:
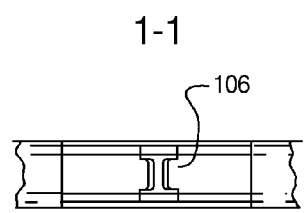
Figure 1C:
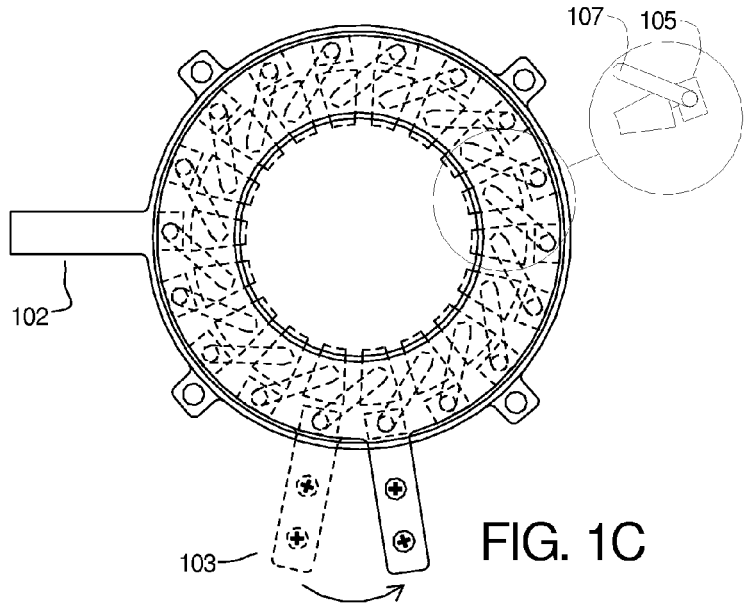

To use this appliance, you begin with the view shown in FIG. 1C. To make a single cut into a piece of fruit, you retract the blades by holding the fixed handle 102 in a static position, and with your right hand, grasp the other movable handle 103. You then rotate the movable handle 103 counter clockwise until it stops. Next, lower the appliance over the product and position it at the place where you want to make the cut. As shown in FIG. 1A, with your left hand still holding the fixed handle 102, you rotate the movable handle 103 with your right hand clockwise until it stops. This moves the blades inward to make a single cut into the fruit. To remove the appliance, retract the blades by rotating the movable handle 103 counter clockwise until it stops and lift the appliance off of the fruit.

The assembly in FIGS. 1A and 1C includes both handles, the top/bottom covers, along with guide plates which are secured together in a stack with screws. Inside the stack is the inner linkage which activates the blade movement. In the assembly shown in FIG. 1A, the cutting blades are fully extended inward toward the center; in the assembly shown in FIG. 1C, the cutting blades are retracted. Two views of FIG. 1A are shown in FIG. 1B. The moving handle 103 is created by connecting handles on cam plates illustrated in FIG. 2 with the spacer 106.

Figure 1D:
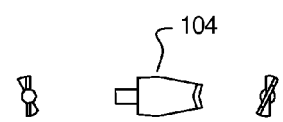

In FIG. 1D, a single knife blade is shown. The blade has a slight axial twist to allow the blade to penetrate easily and provide an additional decorative cut. The blade twist is one embodiment of the apparatus, but is not a requirement.

Figure 1E:
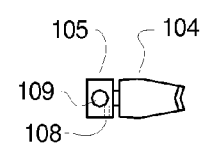

In FIG. 1E, a detail of the blade 104 and cam pin follower 105 is shown. A pin 109 protrudes upwardly and downwardly (not shown in view) and is rigidly attached to the cam pin follower 105. The pin 109 is inside and follows a cam slot 107. The blade is inserted into the cam pin follower 105 and held in place by a set screw 108. In an alternate embodiment, the blade insert end has a machined ring which allows the knife to turn as it moves in and out when the cam pin follower 105 moves in and out radially. In another alternate embodiment, the knife insert end is glued into the camp pin follower 105.

Figure 2:
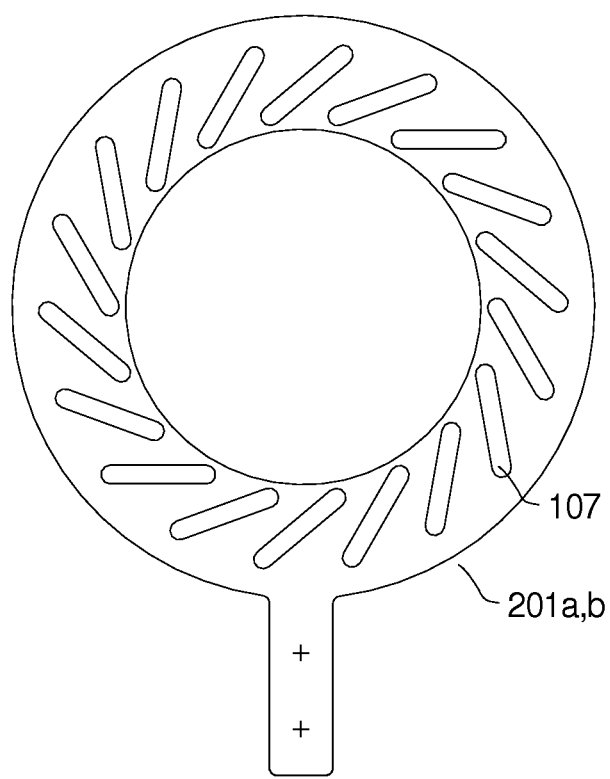
FIG. 2 shows a top view of the cam guide plate.
Figure 5:
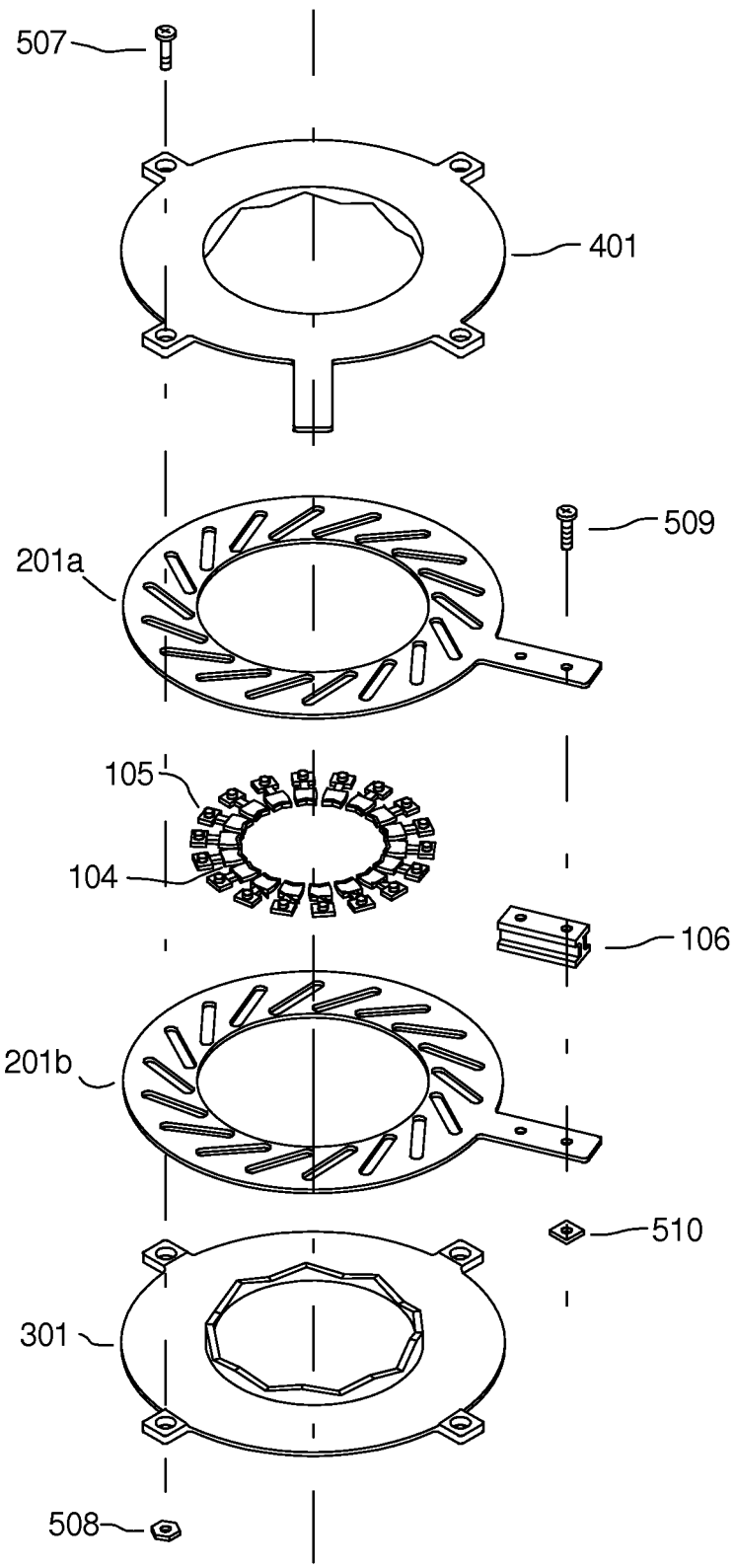
FIG. 5 shows an exploded view of the main parts of the apparatus of the invention.

FIG. 2 shows a top view of cam guide plates 201a,b which are used in the mechanical linkage (see FIG. 5). The cam guide plates are used to transform the rotary motion of the handles into a linear, inward motion of the knife blades toward the center by way of the cam-pin followers inside slots 107.

Figure 3:
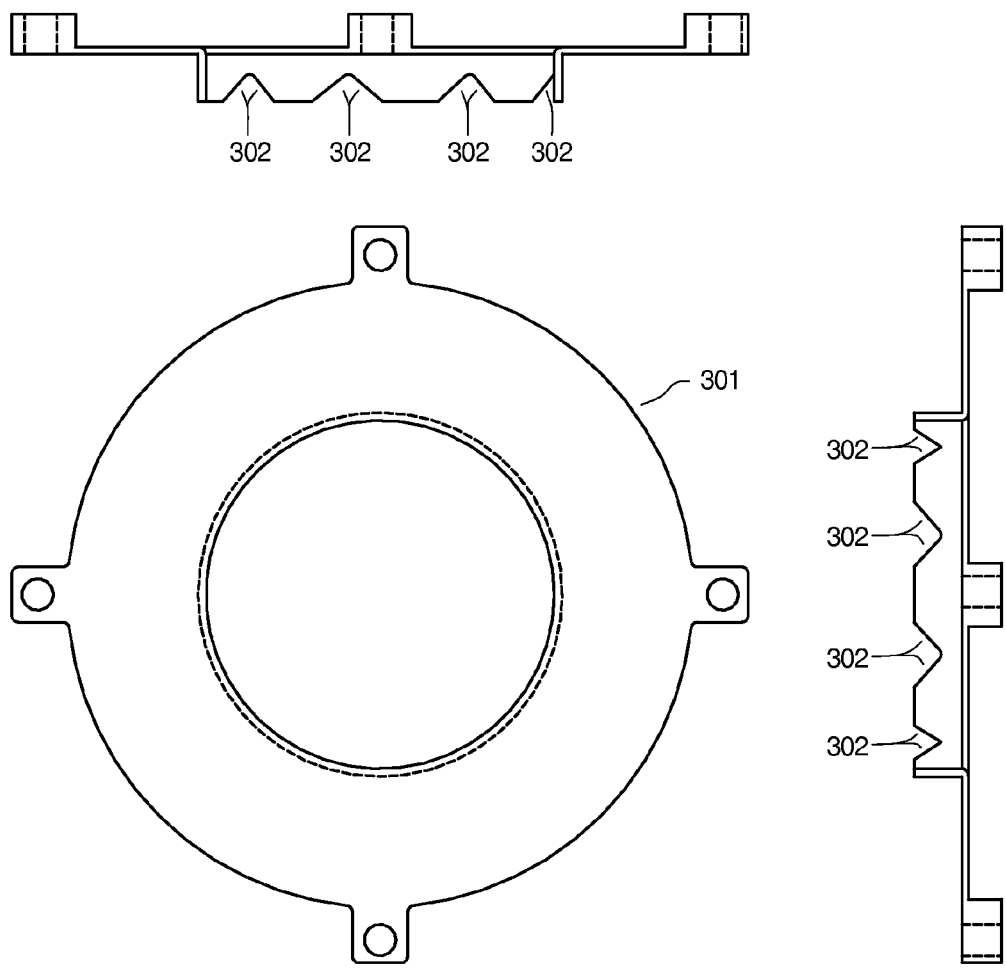
FIG. 3 shows the bottom cover in top and side views.
Figure 4:
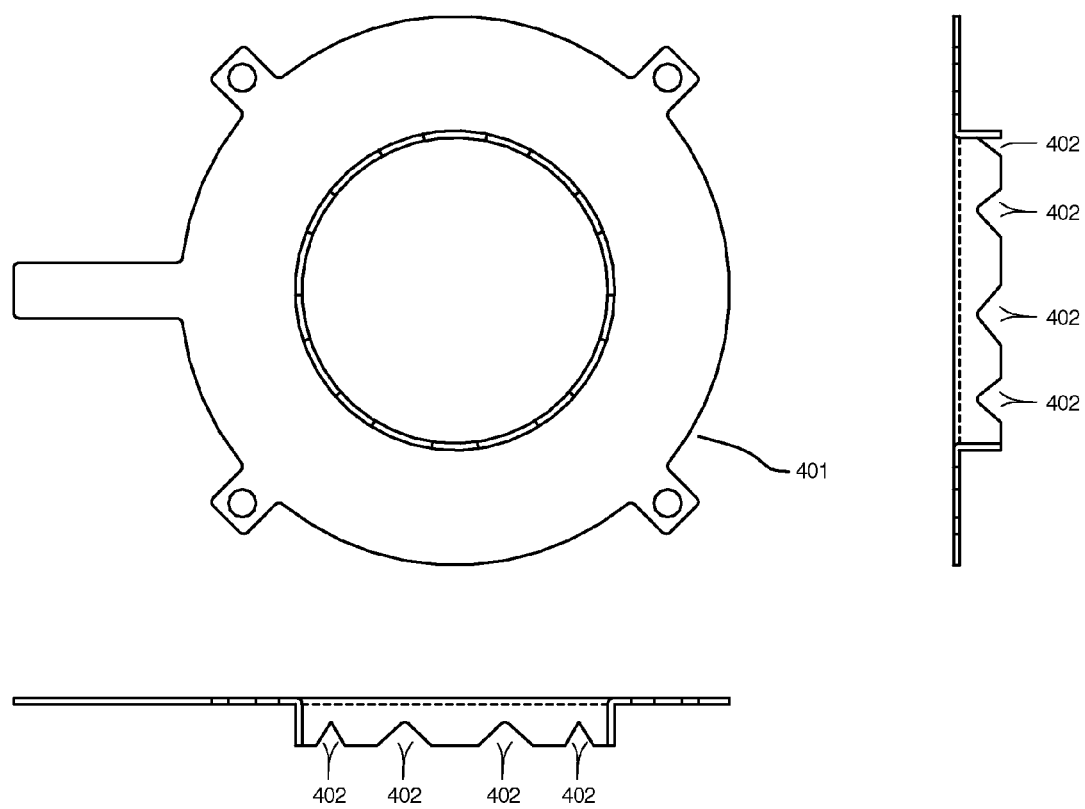
FIG. 4 shows the top cover in top and side views.

FIGS. 3 and 4 show detail views of the bottom cover 301 and top cover 401 which enclose the movable blades. As stated before, the blades incorporate a helix angle so as they will move in a liner, radial motion going toward the center. As they move, they form an iris, and make a complete cut through the fruit. The blades are free to rotate relative to the cam-pin follower.

In an important embodiment of the present invention, the blades are not set up to make a straight cut directly into the food item, but are set up as left and right type of cutters (i.e. at an angle) so that they form the zig-zag cut, and ride on the saw tooth surfaces shown 302, 402. These are radial guiding surfaces for the blades. In another embodiment, the blades incorporate a helix so that the blades spiral slightly as they move inward radially, so that the blades do not interfere with each other and form an iris as they touch, so that they can move further inward.

When assembled, the top and bottom covers are aligned so these guiding surfaces create a slot to constrain the movement of the blades so that they move radially in a controlled manner.

In one embodiment this apparatus is manufactured from thermoplastic or thermosetting polymers using injection molding methods. In another embodiment it is made from metal parts which are formed from machining or stamping methods. In another embodiment, the apparatus is a combination of metal and plastic parts.

FIG. 5 is a simplified exploded view of elements:

| | |
|---|---|
| 301 | Bottom Cover |
| 201a, b | Cam Guide Plates |
| 105 | Cam-Pin Holding Blocks |
| 104 | Cutting Blades |
| 106 | Spacer for Cam Handle |
| 401 | Top Cover with Handle |
| 507 | Screw or Bolt (only one shown for clarity) |
| 508 | Nut |
| 509 | Screw or Bolt (only one shown for clarity) |
| 510 | Nut |

Figure 6:
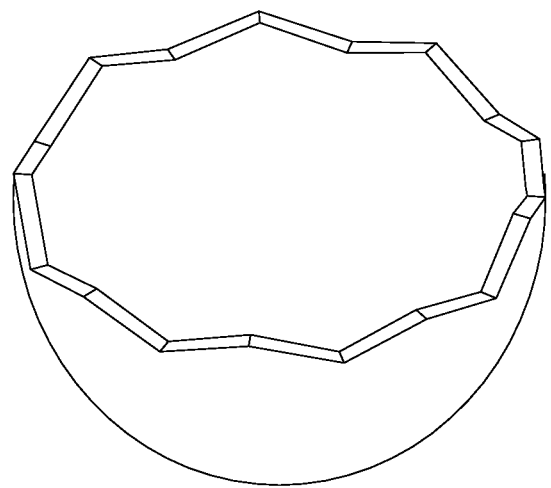
FIG. 6 is an illustration of the type of decorative cut made by the apparatus on a piece of fruit.

FIG. 6 is an illustration of the type of decorative cut made by the present invention. The zig-zag or saw tooth cut is a decorative cut that is attractive, and may be slightly irregular, depending upon how the guiding surfaces are set up. The diameter of the cut varies with the size of the device, and multiple devices (or tools) can be employed with success to cover a variety of sizes of fruits and vegetables. A round, symmetrical tool is one embodiment, but, alternately, a modified version is another embodiment that is elliptical in shape. This may be preferred for certain cutting situations.

While a detailed embodiment and a few embodiments of the present invention have been described, the invention may be modified and adapted according to detailed design needs and preferences. For example, the bottom cover could just as easily incorporate the static handle. The number and width of blades will vary depending upon the diameter of the cut.

While various embodiments of the present invention have been described, the invention may be modified and adapted by those skilled in the art. Therefore, this invention is not limited to the description and figure shown herein, and includes all such embodiments, changes, and modifications that are encompassed by the scope of the claims.

We claim:

1. A food cutter assembly useful for decorative cutting a food circumference substantially simultaneously comprising:
 a. a top cover with radial blade guiding surfaces,
 b. a bottom cover with radial blade guiding surfaces,
 c. wherein said top cover and said bottom cover are aligned so as to allow radial movement of a plurality of blades,
 d. two cam guide plates located between said top cover and said bottom cover,
 e. wherein said blades are connected to pins that are engaged with slots in said guide plates,
 f. wherein a rotation of said cam guide plates relative to said top cover causes said blades to move radially,
 g. wherein said cam guide plates each incorporate a handle that when joined together create a first handle,
 h. wherein said top cover incorporates a second handle, and
 i. a rotation of said first handle relative to said second handle causes said blades to move radially,
 whereby the radial movement of said blades is useful for decorative cutting a circumference of food.

* * * * *